United States Patent
Takahira et al.

(10) Patent No.: US 6,299,975 B1
(45) Date of Patent: Oct. 9, 2001

(54) PRESSURE-SENSITIVE ADHESIVE SHEETS COMPRISING PHOTO-POLYMERIZATION PRODUCT AND PRODUCTION METHOD THEREOF

(75) Inventors: Hitoshi Takahira; Masahiro Oura; Takao Yoshikawa; Hiroaki Kishioka, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/234,126

(22) Filed: Jan. 19, 1999

(30) Foreign Application Priority Data

Jan. 16, 1998 (JP) .................................................. 10-007051

(51) Int. Cl.$^7$ .................................. B32B 7/12; C08F 2/46
(52) U.S. Cl. ....................... 428/343; 428/411.1; 522/104; 522/106; 526/82; 524/833
(58) Field of Search ................................ 438/411.1, 343; 522/106, 104; 526/82; 524/833

(56) References Cited

U.S. PATENT DOCUMENTS

| | | |
|---|---|---|
| 5,354,600 | 10/1994 | Fisher et al. . |
| 5,502,085 | 3/1996 | Ohura et al. .......................... 522/106 |

FOREIGN PATENT DOCUMENTS

| | | |
|---|---|---|
| 0 224 795 | 6/1987 | (EP) . |
| 0224795 * | 6/1987 | (EP) . |
| 0 567 786 | 11/1993 | (EP) . |
| 0567786 * | 11/1993 | (EP) . |

* cited by examiner

*Primary Examiner*—Necholus Ogden
(74) *Attorney, Agent, or Firm*—Sughrue, Mion, Zinn, Macpeak & Seas, PLLC

(57) ABSTRACT

A pressure-sensitive adhesive sheet prepared by coating a composition containing a) 100 parts by weight of monomers composed of from 70 to 100% by weight of a (meth)acrylic acid alkyl ester, said alkyl group having from 2 to 14 carbon atoms, and from 0 to 30% by weight of a monoethylenically unsaturated monomer copolymerizing therewith, b) from 0.1 to 5 parts by weight of a radical chain inhibitor, c) from 0.02 to 5 parts by weight of a polyfunctional (meth)acrylate as a crosslinking agent, d) from 0.005 to 1 part by weight of a photopolymerization initiator, and e) from 0.01 to 10 parts by weight of a silane coupling agent, on a releasing-treated film having a good surface smoothness and photopolymerizing the coated layer to form a pressure-sensitive adhesive layer having a haze value of 1% or lower and a total light transmission of at least 90%. The pressure-sensitive adhesive sheet is excellent in the transparency, the foaming resistance, the low out-gas property, and the discoloring resistance (heat resistance and weather resistance).

5 Claims, No Drawings

PRESSURE-SENSITIVE ADHESIVE SHEETS COMPRISING PHOTO-POLYMERIZATION PRODUCT AND PRODUCTION METHOD THEREOF

FIELD OF THE INVENTION

The present invention relates to a sheet-form or tape-form pressure-sensitive adhesive sheet having a layer of a photopolymerized acrylic pressure-sensitive adhesive and to a production method thereof.

BACKGROUND OF THE INVENTION

Acrylic pressure-sensitive adhesive tapes are excellent in the adhesive force, the cohesive force, etc., and are used as fixing tapes, masking tapes, etc., for electronic parts. The pressure-sensitive adhesive tapes of this kind are usually produced by a method of solution-polymerizing a (meth) acrylic acid alkyl ester and, if necessary, other monomer such as acrylic acid in an organic solvent, compounding the polymer obtained with a tackifier resin and a crosslinking agent and the like, to prepare a pressure-sensitive adhesive, and after coating the pressure-sensitive adhesive on a base material or a releasing liner, removing the organic solvent by heating.

The acrylic pressure-sensitive adhesive sheets produced as described above are liable to cause discoloring such as yellowing under a high-temperature atmosphere or an exposure in the open air by, perhaps, the influence of the compounded component such as a crosslinking agent or in the pressure-sensitive adhesive sheets. Furthermore, there is a possibility that an organic solvent remained in the layer of the pressure-sensitive adhesive causes the occurrence of bubbles at the adhered interface. Furthermore, when the pressure-sensitive adhesive sheets are applied to electronic instruments such as a display, there is a possibility that the remained solvent causes the corrosion of electronic parts.

On the other hand, recently, a method of obtaining acrylic pressure-sensitive adhesive sheets by a photopolymerization has been investigated. In the method, after coating a composition composed of a (meth)acrylic acid alkyl ester as the main constituent added with a photopolymerization initiator on a base material or a releasing liner, by photopolymerizing the coated layer by the irradiation of a ultraviolet ray, etc., a layer of a pressure-sensitive adhesive is formed without using an organic solvent. The pressure-sensitive adhesive sheets produced by the method do not substantially cause problems of the occurrences of bubbles and corrosions caused by the remaining organic solvent and thus, have been expected as preferred pressure-sensitive adhesive sheets from the points of safety and an environmental hygiene.

However, in the photopolymerization type pressure-sensitive adhesive sheets, there are problems that the pressure-sensitive adhesive sheets are inferior in the adhesion to an adherend having a low polarity, such as a polycarbonate plate which is used as a protective plate for a display, etc., and bubbles generate at the adhered interface by the influence of moisture generated from the adherend, etc., to lower the appearance and the visuality. Also, when a large amount of a photopolymerization initiator is used for increasing the polymerization ratio, the initiator remains in the photopolymerization product to cause discoloring under a high-temperature atmosphere, while when the amount of the initiator is less, many unreacted monomers remain in the photopolymerization product, which cause bubbling at the adhered interface and gives a possibility of causing corrosions of electronic parts. Furthermore, depending on the surface state of a base material or a releasing liner on which the layer of the pressure-sensitive adhesive composed of the photopolymerized product is formed, the transparency is sometimes greatly reduced.

SUMMARY OF THE INVENTION

The present invention has been made under such circumstances and an object of the present invention is to provide a pressure-sensitive adhesive sheet, which is excellent in the foaming resistance and the low out-gas property, namely, being hard to cause a foaming phenomenon lowering the appearance and the visuality at the adhered interface and giving less volatile components such as unreacted monomers causing the corrosion of electronic parts, is hard to cause discoloring such as yellowing under a high-temperature atmosphere or the exposure in the open air, is excellent in the discoloring resistance (heat resistance and weather resistance), and further is excellent in the transparency, as a photopolymerization type pressure-sensitive adhesive sheet suitably used for sticking a plastic protective plate and a glass plate of a display.

As the result of various investigations for attaining the above-described object, the present inventors have discovered that in the composition containing an acrylic monomer and a photopolymerization initiator, the amount of the photopolymerization initiator is restrained to a small amount but not hindering the photopolymerization, specific amounts of a radical chain inhibitor, a crosslinking agent, and a silane coupling agent are added to the composition and the composition is coated on releasing-treated film having a good surface smoothness as a releasing liner followed by carrying out the photopolymerization, a layer of a pressure-sensitive adhesive excellent in the foaming resistance, the low gas-out property, the discoloring resistance (heat resistance and weather resistance), and the transparency can be formed.

That is, the first aspect of the present invention is a pressure-sensitive adhesive sheet of a sheet form, a tape form, etc., having the layer of a pressure-sensitive adhesive comprising the photopolymerized product of a composition containing the following five components a) to e);

a) 100 parts by weight of monomers composed of from 70 to 100% by weight of a (meth)acrylic acid alkyl ester having on an average from 2 to 14 carbon atoms of the alkyl group, and from 0 to 30% by weight of a monoethylenically unsaturated monomer copolymerizable therewith, each based on the total amount of the monomers, b) from 0.1 to 5 parts by weight of a radical chain inhibitor, c) from 0.02 to 5 parts by weight of a polyfunctional (meth)acrylate as a crosslinking agent, d) from 0.005 to 2 part by weight of a photopolymerization initiator, and e) from 0.01 to 10 parts by weight of a silane coupling agent, wherein the pressure-sensitive adhesive layer has a haze value of not higher than 1% and a total light transmission of at least 90%.

The second aspect of the present invention is a production method of the pressure-sensitive adhesive sheet having the above-described construction, which comprises coating a composition containing the above-described five components (a) to (e) on a film which has been subjected to release treatment and has a good surface smoothness (hereinafter referred to as "releasing-treated film having a good surface smoothness") and photopolymerizing the coated layer to form a pressure-sensitive adhesive layer having a haze value of not higher than 1% and a total light transmission of at least 90%.

Particularly, the third aspect of the present invention is the production method of a pressure-sensitive adhesive sheet of the above-described second aspect wherein in the above-described releasing-treated film having the good surface smoothness, the center-line mean roughness (Ra) is 0.2 μm or lower and the maximum height (Rmax) is 0.6 μm or shorter.

As described above, in the present invention, by restraining the amount of a photopolymerization initiator to a small amount and incorporating a radical chain inhibitor, an improved discoloring resistance (heat resistance and weather resistance), which is hard to cause discoloring such as yellowing even when the pressure-sensitive adhesive sheet is exposed under a high-temperature atmosphere and in the open air after photopolymerization, is obtained. Also, even though the amount of the photopolymerization initiator is small, the amount is not too small to give an hindrance to the photopolymerization, and also a crosslinking agent is contained, whereby a photopolymerized product containing less volatile components such as unreacted monomers and satisfying a cohesive force and an adhesive force can be formed, furthermore, by incorporating a silane coupling agent in the photopolymerized product, a good result is obtained in the adhesive property to a plastic protective plate, etc., and after all, the excellent foaming resistance and low gas-out property which is hard to cause a foaming phenomenon of lowering the appearance and visuality at the adhered interface and does not have a possibility of causing corrosion, etc., of electronic parts can be obtained.

Furthermore, in the present invention, as described above, in the photopolymerization of a composition comprising an acrylic monomer containing specific amounts of a photopolymerization initiator, a radical chain inhibitor, a crosslinking agent and a silane coupling agent, the problem of increase of the haze value of the pressure-sensitive adhesive layer composed of a photo-polymerized product, which has hitherto been unavoidable in carrying out the photopolymerization on a paper-made releasing liner inferior in the surface smoothness, can be prevented by carrying out the photopolymerization on a releasing-treated film having a good surface smoothness. This provides a pressure-sensitive adhesive layer having a small haze value of not higher than 1% and a high total light transmission of at least 90%, which exhibits considerable improvement in the visuality as well as transparency.

DETAILED DESCRIPTION OF THE INVENTION

Then, the present invention is described in detail.

The (meth)acrylic acid alkyl ester used for the composition of the present invention is the main constituent of the monomers as the component a) and the monofunctional (meth)acrylate of a non-tertiary alkyl alcohol, wherein the alkyl group has from 2 to 14 carbon atoms, is preferably used.

Such a monomer includes, for example, ethyl (meth) acrylate, butyl (meth)acrylate, isoamyl (meth)acrylate, n-hexyl (meth)acrylate, 2-ethylhexyl (meth)acrylate, isooctyl (meth)acrylate, isononyl (meth)acrylate, decyl(meth) acrylate, and dodecyl (meth)acrylate. They may be used singly or as a combination of two or more kinds thereof.

The monoethylenically unsaturated monomer copolymerizable with the above-described (meth)acrylic acid alkyl ester is used to improve the heat resistance and the adhesive property and to effect modification by copolymerizing the (meth)acrylic acid alkyl ester with the monoethylenically unsaturated monomer to introduce a functional group and a polar group thereto. Practically, examples of the ethylenically unsaturated monomer include acrylic acid, itaconic acid, sulfopropyl acrylate, hydroxyalkyl acrylate, cyanoalkyl acrylate, acrylamide, substituted acrylamides, N-vinylcaprolactam, acrylonitrile, 2-methoxyethyl acrylate, glycidyl acrylate, and vinyl acetate. They are used singly or as a combination of two or more kinds according to the purposes.

With respect to the amounts of the (meth)acrylic acid alkyl ester and the monoethylenically unsaturated monomer copolymerizable with the (meth)acrylic acid alkyl ester, it is preferred that the amount of the (meth)acrylic acid alkyl ester, which becomes the main constituent, is from 70 to 100% by weight, and more preferably from 85 to 95% by weight and the amount of the monoethylenically unsaturated monomer is from 0 to 30% by weight, and more preferably from 5 to 15% by weight, each based on the total amount of the monomers. The adhesive property and heat resistance can be well balanced by using these monomers in the above range.

Examples of the radical chain inhibitor used for the composition of the present invention as the component b) include triethylene glycol-bis[3-(3-t-butyl-5-methyl-4-hydroxyphenyl)propionate], 1,6-hexanediol-bis[3-(3,5-di-t-butyl-4-hydroxyphenyl)propionate, 2,4-bis-(n-octylthio)-6-(4-hydroxy-3,5 -di-t-butylanilino)-1,3,5-triazine, penthaerythrityl-tetrakis[3-(3,5-di-t-butyl-4-hydroxyphenyl)propionate], 2,2-thiodiethylenebis[3-(3,5-di-t-butyl-4-hydroxyphenyl)propionate], octadecyl-3-(3,5-di-t-butyl-4-hydroxyphenyl)propionate, N,N'-hexamethylenebis(3,5-di-t-butyl-4-hydroxyhydrocinnamamide, 3,5-di-t-butyl-4-hydroxybenzylphosphonate-diethyl ester, 1,3,5-trimethyl-2,4,6-tris (3,5-di-t-butyl-4-hydroxybenzyl)benzene, bis(ethyl 3,5-di-t-butyl-4-hydroxybenzylphosphonate)calcium, tris-(3,5-di-t-butyl-4-hydroxybenzyl)-isocyanurate, octylated diphenylamine, 2,4-bis[(octhylthio)methyl]-o-cresol, N,N'-bis[3-(3,5-di-t-butyl-4-hydroxyphenyl)propionyl]hydrazine, tris(2,4-di-t-butylphenyl)phosphite. 2,2,4-trimethyl-1,2-dihydroqionone, poly(2,2,4-trimethyl-1,2-dihydroquinoline), 6-ethoxy-1,2-dihydro-2,2,4-trrimethylquinoline, tetrabismethylene-3-(3'-5'-di-t-butyl-4'-hydroxyphenyl)propionate methane, phenyl-1-naphthylamine, diphenylamine, 4,4'-bis(α,α-dimethylbenzyl)diphenylamine, p-(p-toluenesulfonylamido) diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, 2,6-di-t-butyl-4-methylphenol, 2,6-di-t-butyl-4-ethylphenol, (α-methylbenzyl)phenol, di-(α-methylbenzyl)phenol, tri-(α-methylbenzyl)phenol, 2,2-methylenebis(4-ethyl-6-t-butylphenol), 2,2'-methylenebis(4-methyl-6-t-butylphenol), 4,4'-butylidenebis(3-methyl-6-t-butylphenol), 4,4'-thiobis (3-methyl-6-t-butylphenol), 2,5-di-t-butylhydroquinone, 2,5-di-t-amylhydroquinone, 2-mercaptobenzimidazole, 2-mercaptomethylbenzimidazole, bis (2-mercaptobenzimidazole)zinc, bis(2-mercaptomethylbenzimidazole)zinc, nickel diethylthiocarbamate, nickel dibutyldithiocarbamate, 1,3-bis(dimethylaminopropyl)-2-thiourea, tributyl thiourea, tris (nonylphenyl)☐phosphite, dilauryl thiodipropionate, 1,1,3- tris(3-t-butyl-6-methyl-4-hydroxyphenyl)butane, 3,9-bis{2-[3-(3-t-butyl-4-hydroxy-5-methylphenyl)propionyloxy]-1,1-dimethylethyl}-2,4,8,10-tetraoxaspiro[5,5]undecane, bis(nonylphenyl)pentaerythritol-di-phosphite, bis(2,4-di-t-butylphenyl)pentaerythritol-di-phosphite, bis(2,6-di-t-butyl-4-methylphenyl)pentaerythritol-di-phosphite, 2,2-methylenebis-(4,6-di-t-butylphenyl)octyl phosphite, trisphenyl phosphite, and tetrakis[methylene-3-(dodecylthio)propionate]methane.

In the composition of the present invention, one kind or two or more kinds of the above-described compounds are used as the radical chain inhibitor of the component b). The amount of the compound(s) is from 0.1 to 5 parts by weight, and preferably from 0.5 to 1 part by weight to 100 parts by weight of the monomers of the component a).

If the amount of the radical chain inhibitor is less than 0.1 part by weight, the pressure-sensitive adhesive sheet is inferior in the improvement of the discoloring resistance (heat resistance and weather resistance). On the other hand, if the amount thereof is larger than 5 parts by weight, the total light transmission is reduced to lower the transparency of the pressure-sensitive adhesive sheet and also the photopolymerization is hindered to leave large amounts of unreacted monomers, which causes the generation of bubbles at the adhered interface and also causes the corrosion of electronic parts.

The crosslinking agent used for the composition of the present invention as the component c) is a component for increasing the cohesive force of the pressure-sensitive adhesive to increase the shearing strength. As the crosslinking agent, a polyfunctional (meth)acrylate having at least two functional groups composed of (meth)acryloyl groups in the molecule, such as trimethylolpropane tri(meth)acrylate, pentaerythritol tetra(meth)acrylate, 1,2-ethylene glycol di(meth)acrylate, and 1,6-hexanediol di(meth)acrylate, is used.

The polyfunctional (meth)acrylate is used in the range of from 0.02 to 5 parts by weight, and preferably from 0.1 to 3 parts by weight to 100 parts by weight of the monomers of the component a). In the above-described range of the amount, in the case of a bifunctional (meth)acrylate, the amount can be increased and in the case of a trifunctional or higher functional (meth)acrylate, the amount can be reduced but the amount of the polyfunctional (meth)acrylate is less than 0.02 part by weight, the crosslinked degree after the photopolymerization becomes low and bubbles are liable of form at the adhered interface, while if the amount is more than 5 parts by weight, the adhesive force is lowered and swelling, etc. are liable to occur.

The photopolymerization initiator used for the composition of the present invention as the component d) includes benzoin ethers such as benzoin methyl ether, benzoin propyl ether, etc.; substituted benzoin ethers such as anisoin methylether; substituted acetophenones such as 2,2-diethoxyacetophenone, and 2, 2-dimethoxy-2-phenoneacetophenone; substituted α-ketols such as 2-methyl-2-hydroxypropiophenone; aromatic sulfonyl chlorides such as 2-naphthalenesulfonyl chloride; and photoactive oximes such as 1-phenone-1,1-propanedion-2-(o-ethoxycarbonyl)oxime.

The photopolymerization initiator is used in the ratio of from 0.005 to 1 part by weight, and preferably from 0.05 to 0.5 part by weight per 100 parts by weight of the monomers as the component a). If the amount of the photopolymerization initiator is less than 0.005 part by weight, many unreacted monomers remain after the photopolymerization and bubbles are liable to form at the adhered interface. Also, if the amount is more than 1 part by weight, the photopolymerization initiator remains in the photopolymerized product, which is liable to cause yellowing.

The silane coupling agent used for the composition of the present invention as the component e) is an organic silicon monomer having two or more different reactive groups in one molecule, the one of the two reactive groups is a reactive group of making chemical bonding with an inorganic substance and the other thereof is a reactive group of making chemical bonding with an organic material. Examples of the reactive group making chemical bonding with an inorganic substance include a methoxy group, an ethoxy group, and a silanol group, and examples of the reactive group making chemical bonding with an organic material include a vinyl group, an epoxy group, a methacryl group, an amino group, and a mercapto group.

Practical examples of the silane coupling agent include vinyltrichlorosilane, vinyltris(β-methoxyethoxy)silane, vinyltriethoxysilane, vinyltrimethoxysilane, γ-methacryloxy-propyltrimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, γ-chloropropyltrimethoxysilane, γ-glycidoxy-propyltriethoxysilane, γ-methacryloxypropylmethyldiethoxysilane, γ-methacryloxypropyltriethoxysilane, N-β-(aminoethyl)-γ-aminopropyltriethoxysilane, and γ-aminopropyltrimethoxysilane.

In these compounds, one or two or more kinds thereof are selected and used and the selection can be determined by considering the compatibility with the composition of the present invention, the viscosity increasing property, the presence or the absence of gelatin, etc.

The silane coupling agent is used in an amount of from 0.01 to 10 parts by weight, and preferably from 0.5 to 1 part by weight to 100 parts by weight of the monomers of the components a). If the amount thereof is less than 0.01 part by weight, the improved effect of the adhesion to a polycarbonate plate, etc., is poor and the generation of bubbles at the adhered interface cannot be prevented, while if the amount is more than 10 parts by weight, the cohesive force of the pressure-sensitive adhesive becomes too high, inconveniences such as lowering of the adhesive force are liable to cause.

In the preparation of the composition of the present invention, first, the monomers of the component a) are mixed with the photopolymerization initiator of the component d) and the premix is partially polymerized to form a coatable syrupy product having a viscosity of from about 500 to 5,000 cp. Then, by mixing the syrupy product with the radical chain inhibitor of the component b), the polyfunctional (meth)acrylate as the crosslinking agent of the component c), the silane coupling agent of the component e), and, if necessary, the additional photopolymerization initiator, the composition of the present invention is prepared. To the composition, if necessary, known various additives such as a filler, a pigment, and an antioxidant can be added each in an amount of about 50 parts by weight or less, as long as the characteristics such as the photopolymerizing property or the transparency of the composition are not adversely affected.

In the present invention, the composition thus prepared is coated on a releasing-treated film having a good surface smoothness as a releasing liner and a photopolymerization treatment is applied by the irradiation of a ultraviolet ray to form a photopolymerized product. It is preferred that the photopolymerization treatment is carried out in an oxygen-free atmosphere formed by replacing with an inert gas such as a nitrogen gas or in a state of intercepting air by covering with a ultraviolet ray transmitting film.

The ultraviolet rays are electromagnetic radiations having a wavelength range of from about 180 to 460 nm but electromagnetic radiations having wavelengths shorter or longer than the above-described wavelength range may be used. As the ultraviolet ray source, an irradiation means, such as a mercury arc, a carbon arc, a low-pressure mercury lamp, an intermediate-pressure mercury lamp, a high-pressure mercury lamp and a metal halide lamp, can be used. The intensity of the ultraviolet ray can be properly established by controlling the distance from the source to the object to be irradiated or controlling the voltage. In view of the irradiation time (productivity), it is usually preferred to use a weak ultraviolet ray of from 0.1 to 7 mw/cm$^2$. The resulting polymerized product generally has a weight-average molecular weight of 100,000 to 6,000,000.

As the releasing-treated film, a plastic film having a thickness of from 25 to 125 μm, such as a polyester film, the surface of which is subjected to a releasing-treatment such as a silicone releasing treatment, having a good surface smoothness is usually used. The extent of the surface smoothness is that the center-line mean roughness Ra is 0.2 μm or lower and preferably 0.1 μm or lower and the maximum height Rmax is 0.6 μm or lower, and preferably 0.4 μm or lower. If the surface smoothness is poor, the haze value of the photopolymerized product is increased and the transparency thereof is lowered by the scattering of light. The commercially available plastic films satisfying the above requirements may be used. Ra and Rmax can be measured according to JIS B 0601-1962.

The photopolymerized product obtained by the photo-polymerization treatment has a sufficiently high molecular weight, has an appropriate crosslinked degree by being internal crosslinked with the crosslinking agent of the component c), and the amounts of volatile components such as unreacted monomers contained in the product are slight. When it is desired to further reduce the volatile components slightly remain in the product, after the photopolymerization treatment, the photopolymerized product may be subjected to a heat-drying treatment. In this case, it is preferred that the heat-drying treatment is carried out by using a drying furnace, in particular, a hot-blast-circulating drying furnace having a far-infrared heater. This is because drying of good efficiency can be carried out in a short time by heat from the inside by the far-infrared heater and the diffusion of the circulating hot blast from the surface. The drying condition differs by the capacity of the drying furnace, but usually, the drying treatment may be carried out at a temperature of from 100 to 130° C. for from several tens seconds to several minutes. If the heating temperature is too high, the shrinkage of the releasing-treated film occurs, which is liable to cause an optical unevenness of the photopolymerized product.

The pressure-sensitive adhesive sheet of the present invention has the layer of the pressure-sensitive adhesive having a thickness of from 10 to 100 μm composed of the photopolymerized product thus produced, wherein the haze value of the layer is 1% or lower, and preferably 0.5% or lower, and the total light transmission is at least 90%, and preferably at least 92%. Because the pressure-sensitive adhesive layer in the present invention has the haze value and the total light transmission described above, the pressure-sensitive adhesive layer is excellent in the transparency as well as is excellent in the foaming resistance and the low out-gas property in addition to the essential adhesive force and the cohesive force by the interaction of the five components a) to e) constituting the photopolymerized product, and also is excellent in the discoloring resistance (heat resistance and weather resistance).

Accordingly, the pressure-sensitive adhesive sheet of the present invention can be suitably used for sticking a plastic protective plate and a glass sheet for a display device and can be used for bonding inside parts of electronic instruments without corroding the electronic parts owing to the low out-gas property. Furthermore, the pressure-sensitive adhesive sheet of the present invention can be used for various uses requiring a transparency, a discoloring resistance, a foaming resistance, and a low out-gas property, and further can be used as general fixing tapes, masking tapes, etc.

In the pressure-sensitive adhesive sheet of the present invention, generally, the layer of the pressure-sensitive adhesive composed of the above-described photopolymerized product is used as a sheet form, a tape form, etc., by itself. However, as far as the transparency, etc., of the above-described layer is not reduced, by using a base material composed of a transparent film such as a polyimide film, a polyester film, a polytetrafluoroethylene film, a polyether ether ketone film, a polyether sulfone film, etc., the layer of the pressure-sensitive adhesive is stuck to one surface or both surfaces of the base material and the present invention can be used as a pressure-sensitive adhesive sheet having the base material.

EXAMPLES

Then, the present invention is described practically by the present invention. In addition, in these examples, all parts are, unless otherwise indicated, by weight.

Example 1

A premix was prepared using 70 parts of isooctyl acrylate, 20 parts of butyl acrylate, 10 parts of acrylic acid, and 0.5 part of 2,2-dimethoxy-phenylacetophenone (Irgacure 651, trade name, made by Ciba-Geigy Ltd.) as a photopolymerization initiator. The premix was partially photopolymerized by exposing to a ultraviolet ray in a nitrogen gas atmosphere to form a coatable syrup having a viscosity of about 5,000 cp. To 100 parts of the partially polymerized syrup were added 1 part of tetrabismethylene-3-(3'-5'-di-t-butyl-4'-hydroxyphenyl)propionate methane as a radical chain inhibitor, 0.2 part of trimethylolpropane triacrylate as a crosslinking agent, and 0.5 part of γ-glycidoxypropyltrimethoxysilane as a silane coupling agent to provide a composition.

After coating the composition on a releasing-treated film (the center-line mean roughness Ra was 0.06 μm and the maximum length Rmax was 0.3 μm) composed of a poly-ethylene terephthalate film having a thickness of 50 μm subjected to a silicone releasing treatment as a releasing liner, the coated layer was photopolymerized by the irradiation of a ultraviolet ray of 900 mj/cm$^2$ using a high-pressure mercury lamp having an intensity of 5 mw/cm$^2$ in a nitrogen gas atmosphere to form a pressure-sensitive adhesive layer composed of the photopolymerized product having a thickness of 50 μm. Thus, a pressure-sensitive adhesive sheet was prepared.

Example 2

A pressure-sensitive adhesive sheet was prepared in the same manner as in Example 1 except that 2 parts of N-β-(aminoethyl)-γ-aminopropyltrimethoxysilane was used in place of 0.5 part of γ-glycidoxypropyltrimethoxysilane as the silane coupling agent.

Example 3

By following the same procedure as in Example 1 using 90 parts of 2-ethylhexyl acrylate, 10 parts of acrylic acid, and 0.5 part of Irgacure (the photopolymerization initiator described in Example 1), a coatable syrup having a viscosity of about 5,000 cp. was prepared. To 100 parts of the partially polymerized syrup were added 2 parts of tetrabismethylene-3-(3'-5'-di-t-butyl-4'-hydroxyphenyl)propionate methane as a radical chain inhibitor, 0.5 part of 1,6-hexanediol diacrylate as a crosslinking agent, and 0.2 part of γ-glycidoxypropylmethyldiethoxysilane as a silane coupling agent to obtain a composition.

After coating the composition on a releasing-treated film (the center-line mean roughness Ra was 0.06 μm and the maximum height Rmax was 0.3 μm) composed of a polyethylene terephthalate film having a thickness of 50 μm subjected to a silicone releasing treatment, the coated layer was polymerized by the irradiation of a ultraviolet ray of 900 mj/cm$^2$ using a high-pressure mercury lamp having an intensity of 5 mw/cm$^2$ under a nitrogen gas atmosphere to form a pressure-sensitive adhesive layer composed of the photopolymerized product having a thickness of 50 μm. Thus, a pressure-sensitive adhesive sheet was prepared.

Example 4

A pressure-sensitive adhesive sheet was prepared in the same manner as in Example 3 except that after forming the layer of the pressure-sensitive adhesive composed of the photopolymerization product having a thickness of 50 μm, the layer was heat-dried at 120° C. for 7 minutes in a hot blast-circulating drier.

Comparative Example 1

A pressure-sensitive adhesive sheet was prepared in the same manner as in Example 1 except that the silane coupling agent (γ-glycidoxypropyltrimethoxysilane) was not used.

Comparative Example 2

A pressure-sensitive adhesive sheet was prepared in the same manner as in Example 1 except that a paper (the center-line mean roughness Ra was 0.89 μm and the maximum height Rmax was 5.36 μm), both surfaces of which were laminated with polyethylene, subjected to a silicone releasing treatment was used as the releasing liner in place of the releasing-treated film composed of the polyethylene terephthalate film subjected to the silicone releasing treatment.

Comparative Example 3

A pressure-sensitive adhesive sheet was prepared in the same manner as in Example 1 except that the amount of "Irgacure 651", which was the photopolymerization initiator used in Example 1, was changed from 0.5 part to 5 parts.

Comparative Example 4

A pressure-sensitive adhesive sheet was prepared in the same manner as in Example 1 except that the amount of "Irgacure 651", which was the photopolymerization initiator used in Example 1, was changed from 0.5 part to 0.002 part.

Comparative Example 5

A pressure-sensitive adhesive sheet was prepared in the same manner as in Example 1 except that the amount of tetrabis-3-(3'-5'-di-t-butyl-4'-hydroxyphenyl)propionate methane, which was the radical chain inhibitor, was changed from 2 parts to 10 parts.

Comparative Example 6

In a flask were placed 90 parts of 2-ethylhexyl acrylate, 10 parts of acrylic acid, 210 parts of ethyl acetate, and 0.4 part of 2,2'-azobisisobutyronitrile and after sufficiently replacing the atmosphere in the system with a nitrogen gas, a solution polymerization was carried out with stirring by heating to a temperature of from 60 to 80° C. to obtain a polymer solution having a viscosity of 120 poises and the polymerization rate of 99% by weight. To the polymer solution were added 2 parts of a polyfunctional isocyanate compound as a crosslinking agent and 0.2 part of γ-glycidoxypropylmethyldiethoxysilane as a silane coupling agent (to 100 parts by the polymer) to prepare a pressure-sensitive adhesive solution.

After coating the pressure-sensitive adhesive solution on a releasing-treated film (the same as used in Example 1) composed of a polyethylene terephthalate film having a thickness of 50 μm subjected to the silicone releasing treatment, the coated layer was dried in a hot-blast-circulating drier for 5 minutes at 40° C. Thereafter, the layer was further dried by heating to 120° C. for 7 minutes to prepare a pressure-sensitive adhesive sheet.

In the above, Ra and Rmax were measured by means of Surfcom 564A manufactured by Tokyo Seimitsu Co., Ltd. at a rate of 0.03 mm/sec according to JIS B 0601-1992.

About each of the pressure-sensitive adhesive sheets prepared in Examples 1 to 4 and Comparative Examples 1 to 6 described above, the haze value and the total light transmission of the layer of the pressure-sensitive adhesive were determined by the following methods, and also, an adhesive force test, a discoloring resistance (heat resistance) test, a foaming resistance test, and a low out gas property test were carried out by the methods described below.

These results are as shown in Table below.

Haze Value and Total Light Transmission

Each pressure-sensitive adhesive sheet was stuck to a slide glass (Matunami micro slide glass having a thickness of 1.0 mm) and after peeling off the releasing liner, the haze value and the total light transmission were measured by a haze meter, Automatic Digital Hazemeter (NDH-20D) manufactured by Nippon Densyoku Kogyo K.K.

Adhesive for Test>

According to JIS Z-0237, using a polycarbonate plate as an adherend, the 180 degree releasing adhesive force (g/20 mm width) was measured.

Discoloring Resistance (Heat Resistance) Test

Each pressure-sensitive adhesive sheet was stuck to a slide glass, after peeling off the releasing liner, the pressure-sensitive adhesive layer was allowed to stand in a hot-blast-circulating drier of 100° C. for 7 days and the discoloration of the color of the pressure-sensitive adhesive layer was visually observed. As the evaluation standard, a sample causing no discoloring such as yellowing was rated as "A" and a sample showing a discoloration was rated as "B".

Foaming Resistance Test

Each pressure-sensitive adhesive sheet was stuck to a polycarbonate plate, after peeling off the releasing liner, the pressure-sensitive adhesive layer was stuck to a polyester film having a thickness of 125 μm, the assembly was allowed to stand in a hot-blast-circulating drier of 80° C. for 24 hours, and the presence or absence of foams at the adhered interface of the layer of the pressure-sensitive adhesive was visually observed. As the evaluation standard, a sample causing no foaming was rated as "A" and a sample causing foaming was rated as "B".

Low Out-Gas Property Test>

From each pressure-sensitive adhesive sheet, 1 g of the pressure-sensitive adhesive was sampled, the sample was heated to 85° C. for 1 hour, 1 ml of a gas in a heated state was injected in a gas chromatographic apparatus and the amount of the gas was measured. In this measurement, the column was DB-FFAP 1.0 μm, the carrier gas was He, and the apparatus was HEWLETT PACKARD HP6890 (GC).

TABLE

|      | Haze Value (%) | Total Light Transmission (%) | Adhesive Force (g/20 mm-width) | Discoloring Resistance | Foaming Resistance | Out-Gas (μg/g) |
|------|------|------|------|---|---|-----|
| Ex 1 | 0.4  | 93.0 | 1,200 | A | A | 40 |
| Ex 2 | 0.4  | 93.0 | 1,300 | A | A | 45 |
| Ex 3 | 0.4  | 92.8 | 1,200 | A | A | 45 |
| Ex 4 | 0.4  | 92.8 | 1,200 | A | A | 20 |
| CE 1 | 0.4  | 93.0 | 1,200 | A | B | 40 |
| CE 2 | 6.0  | 90.0 | 1,200 | A | A | 50 |
| CE 3 | 0.8  | 93.0 | 1,300 | B | A | 35 |
| CE 4 | 0.4  | 93.0 | 1,000 | A | B | 70 |
| CE 5 | 1.0  | 88.0 | 1,100 | A | B | 70 |
| CE 6 | 0.4  | 92.5 | 1,000 | B | B | 250 |

Ex: Example, CE: Comparative Example

EX: EXAMPLE, CE: COMPARATIVE EXAMPLE

As is clear from Table described above, it can be seen that each of the pressure-sensitive adhesive sheets in Examples 1 to 4 of the present invention had a high transparency that the haze value was 0.4% and the total light transmission was about 93% and also satisfies the discoloring resistance, the foaming resistance, and the low out-gas property in addition to the essential adhesive force. On the other hand, each of the pressure-sensitive adhesive sheets in Comparative Examples 1 to 6 was inferior in at least one of the above-described characteristics.

As described above, according to the present invention, in the composition for photopolymerization containing an acrylic monomer and a photopolymerization initiator, the amount of the photopolymerization initiator is restrained to a small amount to an extent of not hindering the photopolymerization, specific amounts of a radical chain inhibitor, a crosslinking agent, and a silane coupling agent are added to the composition, the composition is coated on a releasing-treated film having a good surface smoothness as a releasing liner followed by photopolymerizing. In addition to the essential adhesive characteristics, the pressure-sensitive adhesive sheet prepared according to the present invention is excellent in the foaming resistance, the low gas-out property, the discoloring resistance (heat resistance and weather resistance), and the transparency While the invention has been described in detail and with reference to specific embodiments thereof, it will be apparent to one skilled in the art that various changes and modifications can be made therein without departing from the spirit and scope thereof.

What is claimed is:

1. A method for producing a pressure-sensitive adhesive sheet, comprising the steps of: coating a composition on a releasing-treated film having a good surface smoothness, said composition containing following five components a) to e);

a) 100 parts by weight of monomers composed of from 70 to 100% by weight of (meth)acrylic acid alkyl ester, said alkyl group having on an average from 2 to 14 carbon atoms, and from 0 to 30% by weight of a monoethylenically unsaturated monomer copolymerizable therewith, each based on the total amount of the monomers, b) from 0.1 to 5 parts by weight of a radical chain inhibitor, c) from 0.02 to 5 parts by weight of a polyfunctional (meth)acrylate as a crosslinking agent, d) from 0.005 to 1 part by weight of a photopolymerization initiator, and e) from 0.5 to 10 parts by weight of a silane coupling agent;

and subjecting the coated layer to a photopolymerization treatment to form a pressure-sensitive adhesive layer having a haze value of not higher than 1% and a total light transmission of at least 90%, wherein the releasing-treated film having a good surface smoothness has a center-line mean roughness (Ra) of 0.2 μm or lower and a maximum height (Rmax) of 0.6 μm or lower.

2. The production of method of claim 1, wherein the (meth)acrylic acid alkyl ester comprises at least one selected from the group consisting of ethyl (meth)acrylate, butyl (meth)acrylate, isoamyl (meth)acrylate, n-hexyl (meth)acrylate, 2-ethylhexyl (meth)acrylate, isooctyl (meth)acrylate, isononyl (meth)acrylate, decyl (meth)acrylate, and dodecyl (meth)acrylate.

3. The production method of claim 1, wherein the crosslinking agent is at least one selected from the group consisting of trimethylolpropane tri(meth)acrylate, pentaerythritol tetra(meth)acrylate, 1,2-ethylene glycol di(meth)acrylate, and 1,6-hexanediol di(meth)acrylate.

4. The production method of claim 1, wherein the photopolymerization initiator is at least one selected from the group consisting of benzoin ethers, substituted benzoin ethers, substituted acetophenones, substituted α-ketols, aromatic sulfonyl chlorides, and photoactive oximes.

5. The production method of claim 1, wherein the the silane coupling agent is at least one selected from the group consisting of vinyltrichlorosilane, vinyltris(β-methoxyethoxy)silane, vinyltriethoxysilane, vinyltrimethoxysilane, γ-methacryloxypropyltrimethoxysilane, β-(3,4-epoxycyclohexyl)ethyl-trimethoxysilane, γ-glycidoxypropyltrimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, γ-chloropropyltrimethoxysilane, γ-glycidoxypropyltriethoxysilane, γ-methacryloxypropylmethyldiethoxysilane, γ-methacryloxypropyltriethoxysilane, N-β-(amino-ethyl)-γ-aminopropyltriethoxysilane, and γ-aminopropyltrimethoxysilane.

* * * * *